United States Patent
Waclawsky (10) Patent No.: US 6,449,255 B1
(45) Date of Patent: Sep. 10, 2002

(54) METHOD AND APPARATUS FOR MANAGING PACKETS USING A REAL-TIME FEEDBACK SIGNAL

(75) Inventor: John G. Waclawsky, Fredrick, MD (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/299,324

(22) Filed: Apr. 26, 1999

(51) Int. Cl.[7] ............................................. H04L 12/26
(52) U.S. Cl. ...................... 370/236; 370/249; 370/252; 370/395.4
(58) Field of Search ................................. 370/229, 230, 370/230.1, 232, 235, 235.1, 236, 249, 252, 253, 395.4, 395.41, 412; 709/223, 224, 225, 226

(56) References Cited

U.S. PATENT DOCUMENTS

| | | | |
|---|---|---|---|
| 5,313,454 A | * 5/1994 | Bustini et al. | 370/230 |
| 5,365,514 A | 11/1994 | Hershey et al. | 370/17 |
| 5,375,070 A | 12/1994 | Hershey et al. | 364/550 |
| 5,493,689 A | 2/1996 | Waclawsky et al. | 395/821 |
| 5,586,266 A | 12/1996 | Hershey et al. | 395/200.11 |
| 5,615,135 A | 3/1997 | Waclawsky et al. | 364/551.01 |
| 6,023,456 A | * 2/2000 | Chapman et al. | 370/252 |
| 6,097,699 A | * 8/2000 | Chen et al. | 370/231 |
| 6,178,235 B1 | * 1/2001 | Peterson et al. | 379/134 |
| 6,215,768 B1 | * 4/2001 | Kim | 370/230 |

* cited by examiner

Primary Examiner—Ricky Ngo
(74) Attorney, Agent, or Firm—Chapin & Huang, L.L.C.; David E. Huang (57) ABSTRACT

A technique manages packets in a data communications device having a memory using a real-time feedback signal. The technique involves transmitting an initial set of packets from the data communications device. The technique further involves monitoring transmission of the initial set of the packets from the data communications device, and providing the real-time feedback signal indicating transmission information regarding the initial set of packets. Additionally, the technique involves manipulating a new set of packets within the memory of the data communications device based on the real-time feedback signal, and transmitting the new set of packets from the data communications device based on how the new set of packets was manipulated within the memory of the data communications device. The use of the real-time feedback signal enables the data communications device to make on-the-fly adjustments to dynamically changing traffic patterns without the need for human intervention.

27 Claims, 7 Drawing Sheets

METHOD AND APPARATUS FOR MANAGING PACKETS USING A REAL-TIME FEEDBACK SIGNAL

BACKGROUND OF THE INVENTION

A typical data communications network includes a number of host computers linked by one or more data communications devices coupled via any type of transmission media. Data is transmitted between one or more hosts on the network in the form of network packets or cells which typically have a predefined, standardized format.

In some networks, network packets are classified into different Quality of Service (QoS) classes which dictate how competing traffic flows are allocated resources which effects how quickly such packets travel from their sources to their destinations.

In such a network, data communications devices (e.g., routers and repeaters) typically receive and retransmit network packets based on the QoS classes of the packets. For example, in a network having video packets as a first QoS class and email packets (electronic mail) as a second QoS class, a network router may internally manage packets such that received video packets are retransmitted with less delay than email packets. As a result, network packet destinations (e.g., receiving hosts) generally perceive different responses, or Qualities of Service, for different QoS classes (e.g., faster video transmissions than email transmissions).

In a network which uses QoS classifications, data communications devices generally manage network packets internally according to packet management algorithms. Typically, in such a device, the algorithms provide control signals as a function of local network traffic data which has been accumulated and post-processed over an extended period of time. For example, a network router may operate in a particular manner based on local network traffic data, which has been accumulated and post-processed over several days, to enable the router to achieve QoS goals of transmitting received video packets with a maximum time delay of 100 ns and transmitting received email packets with a maximum time delay of 100 ms.

Typically, a person known as a network administrator is responsible for ensuring that a data communications device (e.g., the router) achieves its QoS goals. When the data communications device does not provide adequate QoS, the administrator analyzes the operation of the device relative to the local network traffic and attempts to improve the performance of the device to enable it to achieve its QoS goals. Furthermore, even if the device adequately achieves its QoS goals, the administrator may still attempt, on occasion, to further improve the performance of the device to enable it to more easily manage network packets and achieve its QoS goals.

When the administrator attempts to improve a data communication device's ability to manage network packets, the administrator typically studies the network traffic passing through the particular point where the device is connected to the network. For example, the administrator may connect a network packet monitor at the input of the data communications device to classify packet sizes, to count the number of packets in total or the number of packets of a particular QoS class received by the data communications device. Often, the administrator allows the monitor to accumulate this information over an extended period of time such as several hours or perhaps several days. For example, the monitor stores the size and count information in a computer file on a computer for future analysis.

After the count information has been collected, the administrator generates particular network metrics from the count information. For example, the administrator may have logged the amount of time that elapsed while collecting the count information. Accordingly, the administrator can determine the overall packet rate provided by the data communications device by dividing the counted overall number of packets by the elapsed time. That is, $$\text{overall packet rate} = \frac{\text{overall number of packets counted}}{\text{elapsed time}}.$$

Similarly, the rate for a particular packet type can be determined by dividing the counted number of packets for a particular QoS class by the elapsed time. That is, $$\text{packet rate for a particular packet type} = \frac{\text{number of packets counted for a particular QoS class}}{\text{elapsed time}}.$$

In this manner, the administrator determines the characteristics of the network traffic handled by the data communications device during the elapsed time period. This information along with packet size information can help improve understanding of the resource requirements of different traffic flows.

After the administrator has determined the network traffic characteristics of the elapsed time period, the administrator examines the settings of the data communications device. In particular, the administrator verifies that the operating parameters of the data communications device are set such that the device will manage packets correctly and efficiently in the future, if the device encounters network traffic having the same characteristics. For example, if the device is already set to handle such traffic correctly and efficiently, the administrator leaves the parameters unchanged or may change the parameters slightly with the hope of improving performance. However, if the device is not set to handle such traffic correctly and efficiently, the administrator modifies the parameters such that the device will handle the traffic correctly and efficiently in the future. The size of the output queues of the data communications device and the priority of different packet types are examples of parameters that the administrator may examine and perhaps adjust.

After the administrator has determined that the data communications device is properly set to manage packets correctly and efficiently and if the data communications device encounters new network traffic having different characteristics as previously encountered during the elapsed time period, the administrator may choose to subsequently repeat the above described procedure at some time in the future. For example, the administrator may (i) monitor the network traffic several days later to accumulate new size and count information, (ii) generate new network metrics using the new information, and (iii) then examine the settings of the data communications device relative to the newly generated network metrics.

Using the above-described technique, the data communications device is tuned to manage network packets correctly and efficiently with the assistance of human intervention by the network administrator. With an aggressive approach towards fine tuning the data communications device, the administrator may repeat the adjustment process a dozen or so times over the course of a several days.

SUMMARY OF THE INVENTION

In contrast to conventional network packet management techniques, the invention is directed to techniques for managing network packets in a data communications device using a real-time feedback signal. In one technique, a traffic monitor observes network packet traffic transmitted from an output of the data communications device, and generates the real-time feedback signal based on the observed traffic. The data communications device manages newly received packets according to the real-time feedback signal, i.e., according to the relatively instantaneously observed traffic, thus enabling the data communications device to perform real-time packet management and adjust to dynamically changing conditions within the network at a rapid pace.

One embodiment involves the use of a data communications device having a memory. The data communications device transmits an initial set of packets which are monitored by a traffic monitor. The traffic monitor then provides the real-time feedback signal indicating transmission information regarding the initial or previous set of packets. The data communications device manipulates (or handles) a new set of packets within its memory based on the real-time feedback signal, and transmits the new set of packets from the data communications device based on how the new set of packets was manipulated within the memory.

Preferably, each packet belongs to one of multiple packet classes, e.g., Quality of Service (QoS) classes such as video, audio, general data and best effort classes. Classes may also be defined by packet source, destination, or any other internal data in the packet, or by other information such as a physical location (e.g., port) on the device upon which the packet arrived. As such, the real-time feedback signal indicates transmission levels of the multiple packet classes for the initial set of packets. For example, the real-time feedback signal may indicate packet counts for each packet class in the initial set, and a total count for the number of packets in the initial set.

The memory of the data communications device preferably stores a queue structure. As such, the data communications device manipulates the new set of packets by scheduling each of the new set of packets in the queue structure based on the transmission levels of the multiple packet classes for the initial set of packets, as indicated by the real-time feedback signal. Alternatively, the device manipulates the new set of packets by reordering queues of the queue structure when the transmission levels of the multiple packet classes for the initial set of packets, as indicated by the real-time feedback signal, cause the data communications device to detect a reorder condition. As another alternative, the device manipulates the new set of packets by discarding a packet of the new set of packets from the queue structure when the transmission levels of the multiple packet classes for the initial set of packets, as indicated by the real-time feedback signal, cause the data communications device to detect a discard condition. As yet another alternative, the data communications device manipulates the new set of packets by performing multiple functions using the real-time feedback signal. For example, the device schedules packets, reorders queues and discards packets, based on the real-time feedback signal. In this arrangement, information within the real-time feedback signal is preferably an input to an algorithm used by the device, as the device performs many complex calculations.

Preferably, each packet includes a bit pattern indicative of one of the multiple packet classes. The bit pattern resides in a predetermined location within each packet, i.e., within a type of service (TOS) field (e.g., indicating the QoS assigned to that packet). As such, to monitor transmission of the initial set of the packets and provide the real-time feedback, the traffic monitor preferably samples (monitors) packets from the initial set of packets. The traffic monitor recognizes, for each sampled packet, a bit pattern of that packet, and updates a set of data structures based on the recognized bit pattern of that packet, the data structures respectively corresponding to the multiple packet classes. Furthermore, the traffic monitor generates the real-time feedback signal based on the updated set of data structures such that the real-time feedback signal is indicative of the transmission levels of the multiple packet classes for the initial (or previous) set of packets.

In the TOS arrangement, the real-time feedback signal preferably indicates a bit count for each of the multiple packet classes, and a total bit count. As such, the data communications device preferably includes traffic analysis logic that provides a bit rate for each of the multiple packet classes based on the bit count for each of the multiple packet classes and the total bit count such that the new set of packets are manipulates based on the bit rate for each of the multiple packet classes.

Preferably, the data communications device can request information from the traffic monitor. In particular, the device requests the information by generating a request signal for information regarding the transmission levels of the multiple packet classes for the initial set of packets or any previous set of packets. In response, the traffic monitor generates the real-time feedback signal such that it includes the requested information.

It should be understood that network traffic patterns may shift within a relatively short period of time. As such, some conventional data communications devices may not be optimally adjusted to manage a network traffic with particular characteristics if the adjustments are infrequent or if the adjustments rely on network data gathered over extended periods of time. In contrast, the invention involves optimally adjusting how a data communications device manages packets based on a real-time feedback signal. Accordingly, if the traffic pattern shifts within a relatively short period of time, the data communications device, configured according to the invention, can adapt its operation to more optimally manage packets in a manner superior to that done in conventional data communications devices.

Additionally, the invention provides for an automated adjustment process. That is, once configured in accordance with the invention, no human intervention is required to enable the data communications device to manage packets correctly and efficiently within a network having changing network traffic characteristics. Rather, the real-time feedback signal is generated in a contiguous manner enabling the data communications device to adjust its operation dynamically and automatically.

Furthermore, unlike conventional systems which have large storage requirements to store large amounts of network data gathered over extended periods of time and large processors to analyze the network data, the invention has relatively small hardware requirements. That is, since the invention uses a real-time feedback signal that contains fresh data, there are less memory requirements and processor demands.

Also, the invention enables different types of network information to be gathered on-the-fly. That is, if the invention cannot determine how to adjust itself in view of particular network data acquired from the traffic monitor, the invention can request other types of network data to assist the invention in its determination of how to adjust itself. Accordingly, there is less likelihood that conflicting goals will result in oscillating performance. That is, the invention will tend towards a convergence or compromise between the different goals (e.g., QoS goals). Hence, a first action by the invention based on a particular goal may provide only a modest performance improvement, and a subsequent action based on a different goal may provide a substantially better improvement in a non-oscillating manner.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Overview

Figure 1:
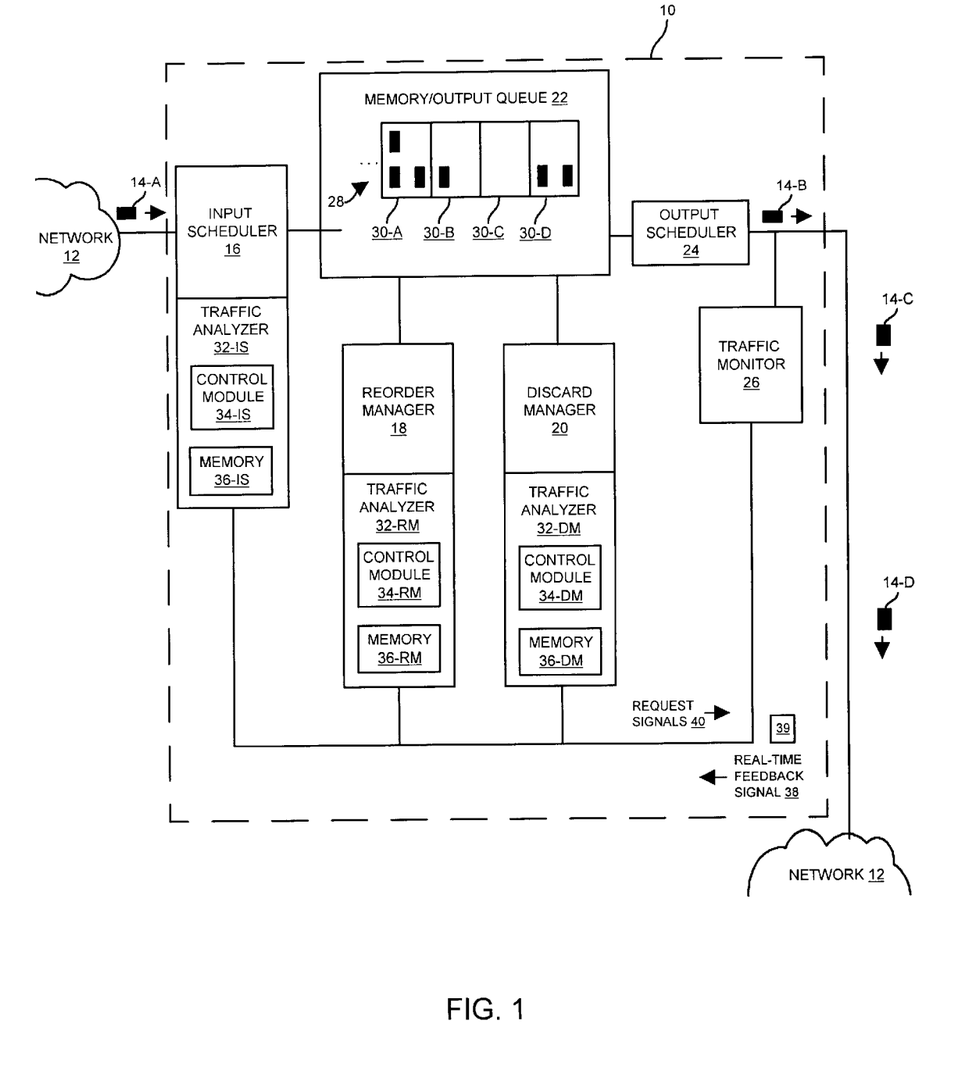
FIG. 1 is a block diagram of a data communications device according to an embodiment of the invention.

The invention is directed to techniques for managing network packets using a real-time feedback signal. FIG. 1 shows a data communications device 10 that connects to a network 12, and manages network packets 14 using such a real-time feedback signal in accordance with the invention. The data communications device 10 includes network packet management modules (16, 18, 20), output circuitry (22, 24) and monitoring circuitry (26). The management modules include an input scheduler 16, a reorder manager 18 and a discard manager 20. The output circuitry includes memory (or output queue) 22 and an output scheduler 24. The monitoring circuitry includes a traffic monitor 26.

When the data communications device 10 is in operation, network packets 14 flow from a portion of the network 12 to the input scheduler 16, through the memory 22, then through the output scheduler 24, and finally into a different portion of the network 12. The traffic monitor 26 preferably connects to the network 12 at an output of the data communications device 10, and observes the network packets 14 transmitted from the output scheduler 24 without interfering with the flow of network packets 14 back into the network 12.

Prior to beginning normal operation, the data communications device 10 forms a queue structure 28 in the memory 22. The queue structure includes multiple queues 30-A, 30-B, 30-C, 30-D, . . . (collectively queues 30) which correspond to different types of service (TOS) supported by the network 12 and the data communications device 10. In one embodiment, the different types of service are different Quality of Service (QoS) classes. By way of example, the data communications device assigns queue 30-A to a best effort QoS class, queue 30-B to a general data QoS class, queue 30-C to an audio QoS class, and queue-30-D to a video QoS class.

As the input scheduler 16 receives packets 14 from the network 12, the input scheduler 16 schedules the packets 14 within the queue structure 28 of the memory 22. In particular, the input scheduler 14 identifies the TOS of each packet 14, and then places that packet 14 in the queue assigned to that TOS (e.g., one of the queues 30-A through 30-D). As a specific example, when the input scheduler 16 identifies a particular packet 14 as a video packet, the input scheduler 16 places the video packet in queue 30-D which is assigned to the video QoS class.

In addition to the input scheduler's ability to schedule packets 14, the input scheduler 16 has the capability to control the size of each queue 30 in an on-the-fly or dynamic manner based on a real-time feedback signal 38 provided by the traffic monitor 26. The input scheduler 16 analyzes network traffic data in the real-time feedback signal 38, and adjusts sizes of the queues 30 if the input scheduler 16 determines that such an adjustment would enable the data communications device 10 to improve its performance. For example, using the real-time feedback signal 38, the input scheduler 16 may determine that there is excess bandwidth available yet general data packets are being discarded by the discard manager 20 due to the small size of queue 30-B. In such a situation, the input scheduler 16 may decide to increase the size of the queue assigned to temporarily store general data packets (e.g., queue 30-B). With such an adjustment, the data communications device 10 may be able to handle transmission of all of the general data packets and without a need to discard packets.

The reorder manager 18 controls the prioritization of the queues 30 within the queue structure 28. In particular, using the real-time feedback signal 38, the reorder manager 18 attempts to order the queues 30 in a manner that enables the data communications device 10 to easily achieve certain TOS requirements. In the example, the TOS requirements are pre-established QoS goals that enable packet destinations to perceive certain responses associated with different QoS classes of packets. Accordingly, in the example, the reorder manager 18 of the data communications device 10 reorders the queues 30 to enable the data communications device 10 to achieve predetermined Quality of Service (QoS) goals based on traffic data stored within the real-time feedback signal 38.

The discard manager 20 controls deletion or discarding of packets from the queues 30. In particular, using the real-time feedback signal 38, the discard manager 20 determines when the data communications device 10 is unable to achieve its TOS goals, and discards packets in such situations in order to achieve such goals. In the example, the discard manager 20 may determine from the real-time feedback signal 38 that the data communications device 10 is not providing video packets in accordance with pre-established QoS goals. In response, the discard manager 20 may begin discarding best effort packets from the queue (e.g., queue 30-A). As a result, more bandwidth becomes available for the video packets, and the data communications device 10 is now able to achieve its QoS goals.

In one embodiment, the input scheduler 16, the reorder manager 18 and the discard manager 20 use a same instance of the real-time feedback signal 38 (e.g., instance 39) when in operation. In another embodiment, the input scheduler 16, the reorder manager 18 and the discard manager 20 use respective instances of the real-time feedback signal 38 to operate asynchronously relative to each other. The latter allows for improved flexibility and customization.

The output scheduler 24 transmits packets 14 (e.g., as a serial bit stream) from the queue structure 28 back into the network 12. Simultaneously, the traffic monitor 26 monitors the transmitted packets 14 (e.g., by identifying patterns in the serial bit stream) and generates a total count of all the packets transmitted as well as individual packet counts for each TOS. In the example, the traffic monitor 26 generates a total packet count and a count for each QoS class. In more sophisticated implementations, the traffic monitor 26 also reports packet sizes.

It should be understood that the traffic monitor 26 is ideally located at the output of the data communications device 10 to measure the output traffic provided by the data communications device 10. Accordingly, the traffic monitor 26 makes direct observations of the data communications device's operation and performance, and the traffic data within the real-time feedback signal 38 accurately reflects the device's operation and performance. Such an arrangement is superior to conventional arrangements that monitor network traffic at the input of a data communications device since monitoring the traffic at the input provides no indication of how successfully the device handles the traffic.

For example, suppose packets of a particular QoS class begin to accumulate in a data communications device queue. If the queue begins to overflow, a conventional data communications device may handle the situation by discarding packets to alleviate the congestion. However, with the invention, the traffic monitor 26 observing the output of the data communications device 10 may determine that other QoS classes are overutilizing the output scheduler 24 thus preventing the particular QoS class of packets from being transmitted. In this situation, the data communications device 10 may then temporarily reprioritize the overflowing queue to a higher priority to provide the overflowing packets greater bandwidth to transmit in order to alleviate the congestion problem. Such reprioritization is a more efficient and effective solution which is overlooked by conventional devices. Further details of various portions of the data communications device 10 will now be provided.

Traffic Monitor

Figure 2:
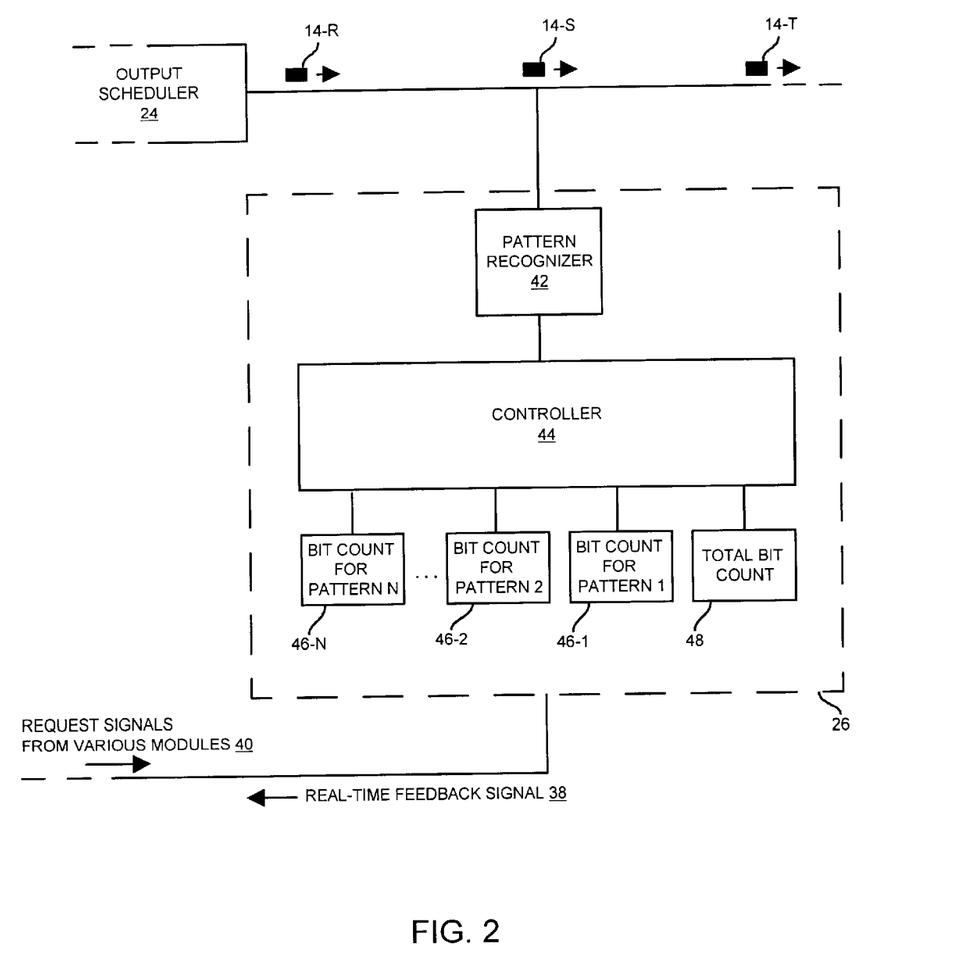
FIG. 2 is a block diagram of a traffic monitor of the data communications device of FIG. 1.

As shown in FIG. 2, the traffic monitor 26 includes a pattern recognizer 42, a controller 44, multiple individual counters 46-1, 46-2, . . . , 46-N (collectively counters 46), and an aggregate counter 48. Before the data communications device 10 begins normal operation, the traffic monitor 26 assigns one of the individual counters 46 to each TOS. Then, during normal operation, the traffic monitor 26 observes packets 14 as they are transmitted from the output scheduler 24, and updates the counters 46,48 such that they indicate the observed network traffic leaving the data communications device 10. In one embodiment, the packets 14 are transmitted from the output scheduler 24 as a serial bit stream, and the pattern recognizer 42 identifies patterns within the serial bit stream to detect packets and to determine the TOS of each detected packet.

In the above QoS example, prior to normal operation, the traffic monitor 26 assigns an individual counter 46 to each QoS class (e.g., video, audio, general data, and best effort). Then, during normal operation, the pattern recognizer 42 scans a class indicator field (i.e., the TOS field) of each packet 14 to determine the QoS of that packet 14. The controller 44 then updates the appropriate counter 46 (i.e., the counter 46 corresponding to that QoS) and the aggregate counter 48. By way of example, for a video packet 14, the controller 44 increments a corresponding one of the counters 46 and the aggregate counter 48.

Figure 3A:
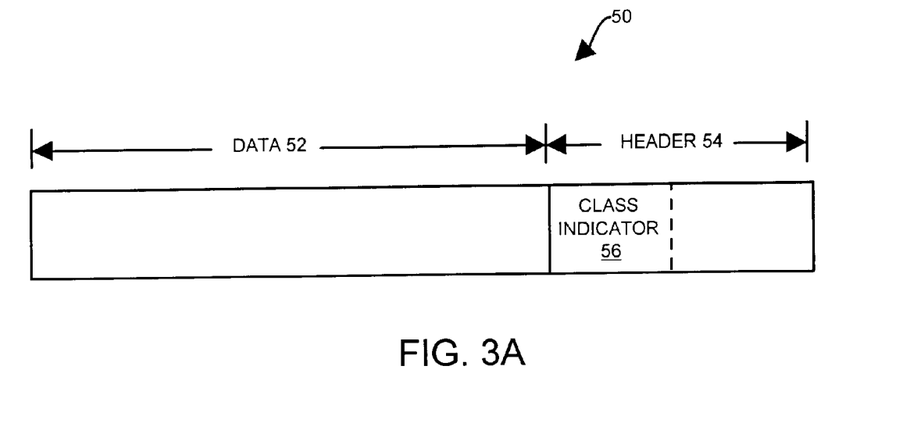
FIG. 3A is a block diagram of a network packet that is suitable for use by the data communications device of FIG. 1.

FIG. 3A shows a format 50 for a network packet 14 that is suitable for use by the invention. The network packet format 50 includes a data portion 52 and a header portion 54. The header portion 54 includes a class indicator field 56 (e.g., bit positions 8–11) that indicates the TOS (e.g., the QoS class for that packet). By way of example only, a class indicator of x0011 indicates video QoS, a class indicator of x001 indicates audio QoS, a class indicator of x001 indicates general data QoS, and a class indicator of x0000 indicates best effort QoS.

Figure 3B:
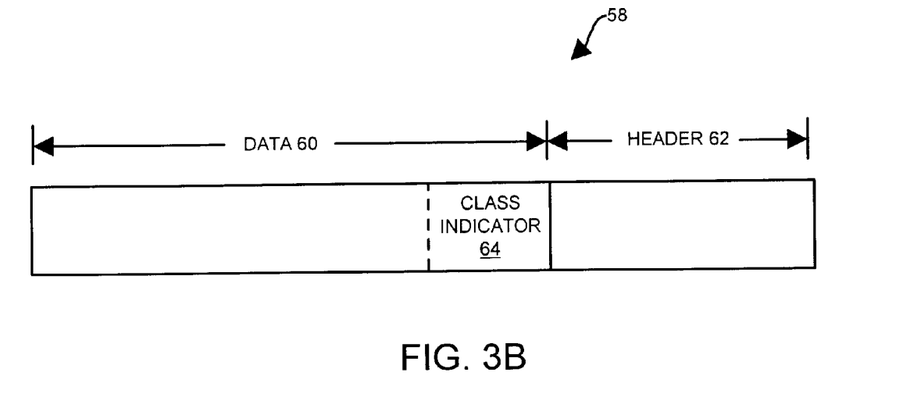
FIG. 3B is a block diagram of an alternative network packet that is suitable for use by the data communications device of FIG. 1.

FIG. 3B shows an alternative format 58 for a network packet 14 that is suitable for use by the invention. The network packet format 58 is similar to the network packet format 50 except that a data portion 60 of the network packet format 58, rather than a header portion 62, stores a class indicator 64. Accordingly, the class associated with a network packet may be determined by an analysis of the actual data carried by that packet.

As the pattern recognizer 42 monitors network traffic on the output of the data communications device 10 and the controller 44 updates the counters 46,48, the controller 44 simultaneously generates the real-time feedback signal 38 and sends the signal 38 to the network packet management modules. In one embodiment, the controller 44 generates and sends the real-time feedback signal 38, as a digital signal, automatically (e.g., every 1 ms) to enable the network packet management modules (16, 18, 20) to dynamically adjust the manner in which they manage packets within the data communications device 10 (e.g., instance 39 in FIG. 1). Alternatively, the controller 44 sends the real-time feedback signal 38 to the management modules on a single line as a time multiplexed analog signal, or on multiple lines as individual analog signals.

Preferably, the traffic data contained within the real-time feedback signal 38 is a copy of the contents of the counters 46,48. Accordingly, large amounts of storage space and processor resources for extensive post-processing are not required. Rather, any complexity involved in analyzing the traffic data (i.e., the counter contents) can be moved to the network packet management modules (the input scheduler 16, the reorder manager 18 and the discard manager 20).

Referring back to FIG. 1, the traffic analyzer 32-IS includes a control module 34-IS and memory 36-IS, and operates such circuitry to analyze basic traffic data stored within the real-time feedback signal 38. In one embodiment, the real-time feedback signal 38 is a digital signal that simply includes the contents of each counter 46 and 48 (see FIG. 2). For this embodiment, the traffic analyzer 32-IS keeps a clock to determine the change in time between receiving each set of counter contents. The traffic analyzer 32-IS determines the total bit rate for the most recent set of transmitted packets from the most recent set of counter contents, the previous set of counter contents and the delta time as follows:

$$\text{Overall Bit Rate} = \frac{\text{most recent total bit count} - \text{previous total bit count}}{\text{time between most recent and previous total bit counts}}.$$

Similarly, the bit rate for any particular packet class can be determined as follows:

$$\text{Bit Rate For Particular Packet Class} = \frac{\text{most recent class bit count} - \text{previous class bit count}}{\text{time between most recent and previous class bit counts}}.$$

Additionally, the percentage of bandwidth can be calculated for each packet class. Below is a calculation for the percentage of video packets:

$$\text{percentage of video data packets} = \frac{\text{number of video data packets counted}}{\text{number of total packets counted}}.$$

Since traffic data analysis is preferably performed within the traffic analyzers 32, the traffic monitor 26 can be kept simple. Accordingly, less processor and memory resources are required for the traffic monitor 26 relative to conventional traffic monitoring devices that store large amounts of traffic data over extended periods of time (e.g., hours or even days) and which then must post-process the large amounts of traffic data.

Nevertheless, more sophisticated monitoring devices are also suitable for the traffic monitor 26. For example, in one embodiment, the traffic monitor 26 counts bits rather than packets 14 in order to provide finer granularity of data. In this embodiment, over specified time intervals, each counter 46 counts bits for a corresponding TOS class of traffic (e.g., for a particular QoS class) and the aggregate counter 48 counts the total number of bits for all TOS classes. The transmission speed (i.e., the speed of the media) is used as a clock. The number of bits counted for each traffic class is then divided by the media speed multiplied by the time interval to determine the media utilization and rate information of each TOS class. This embodiment provides finer resolution than the earlier described packet counting embodiment.

An example of a device that is capable of operating in this manner and that is suitable for the traffic monitor 26 is the Event Driven Interface (EDI) manufactured by International Business Machines of Armonk, New York. The EDI performs pattern recognition based upon a program defined by control vectors. In particular, the EDI receives a serial bit stream (provided by the output scheduler 24), and performs logical pattern recognition to produce signals as an output in response to the identification of specific, predefined patterns in the serial bit stream.

Some details of the EDI and similar traffic monitoring techniques are described in U.S. Pat No. 5,365,514 (Hershey, et al.), entitled "Event driven interface for a system for monitoring and controlling a data communications network," the teachings of which are incorporated by reference herein in their entirety. Other similar traffic monitoring techniques are described in U.S. Pat No. 5,375,070 (Hershey, et al.), entitled "Information collection architecture and method for a data communications network," the teachings of which are incorporated by reference herein in their entirety. Additionally, similar traffic monitoring techniques are described in U.S. Pat No. 5,493,689 (Waclawsky, et al.), entitled "System for configuring an event driven interface including control blocks defining good loop locations in a memory which represent detection of a characteristic pattern," the teachings of which are incorporated by reference herein in their entirety. Furthermore, similar traffic monitoring techniques are described in U.S. Pat. No. 5,586,266 (Hershey, et al.), entitled "System and method for adaptive, active monitoring of a serial data stream having a characteristic pattern," the teachings of which are incorporated by reference herein in their entirety. Still further, similar traffic monitoring techniques are described in U.S. Pat No. 5,615,135 (Waclawsky, et al.), entitled "Event driven interface having a dynamically reconfigurable counter for monitoring a high speed data network according to changing traffic events," the teachings of which are incorporated by reference herein in their entirety.

In one embodiment, the invention uses the flexibility and sophistication of the EDI and similar traffic monitors to enable the real-time feedback signal 38 to include customized data. To take advantage of such features, the traffic analyzers 32 of the management modules (e.g., the traffic analyzer 32-DM of the discard manager 20) are equiped to send a request signal 40 to the traffic analyzer 26 requesting customized data.

Such a feature provides the invention with the ability to better determine the proper course of operation to improve throughput and the data communication device's ability to meet or exceed its QoS goals. Furthermore, the QoS goals may occasionally conflict giving rise to the potential for oscillating operation, i.e., the data communication device operating at one extreme to achieve one goal and then a different extreme to achieve a different goal, and so forth. Such operation is typically undesirable since substantial overhead is needed to shift between operating extremes. To prevent such operation from occurring, the management modules's abilities to request custom traffic data enable the data communications device 10 to achieve convergence of goals, namely a compromise that results in stable yet optimal non-oscillating operation.

Management Modules

Each of the network packet management modules (the input scheduler 16, the reorder manager 18 and the discard manager 20) has a set of module specific TOS goals (e.g., QoS goals), and uses the real-time feedback signal 38 to attain those goals. In particular, when the data communications device 10 is in normal operation, each management module 16, 18, 20 performs a procedure 70 to attain its specific TOS goals, as will now be explained in further detail with reference to FIG. 4.

Figure 4:
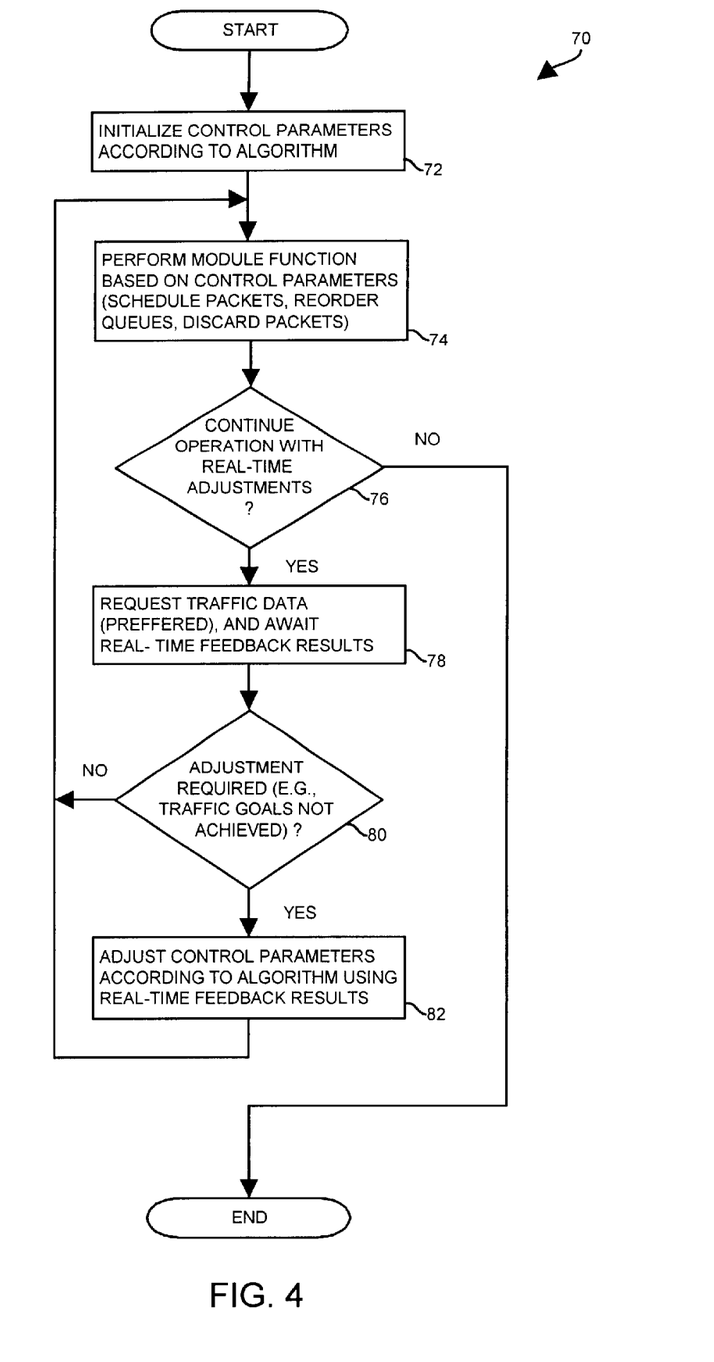
FIG. 4 is a flow diagram illustrating the operation of a management module of the data communications device of FIG. 1.

In step 72, the management module initializes a set of control parameters according to a control algorithm. The control parameters are specific to the particular management module and selected to enable the module to attain a set of particular TOS goals.

In step 74, the management module performs its module function based on the control parameters. The module function is specific to the particular management module as well.

In step 76, the management module checks whether it should continue to operate with real-time adjustments. For example, if the data communications device 10 determines that it should shutdown, the management module terminates or ends the procedure 70. Otherwise, the management module proceeds to step 78.

In step 78, the management module obtains real-time feedback results based on the real-time feedback signal 38 provided by the traffic monitor 26. In particular, the traffic analyzer 32 of the management module analyzes the traffic data contained within the real-time feedback signal 38 to generate the real-time feedback results. Preferably, the management module generates customized results from the traffic data within the real-time feedback signal 38 by performing module-specific calculations using the more general network data contained within the real-time feedback signal 38. In the alternative, if the traffic monitor 26 has enough sophistication to provide the customized results directly, the management module sends requests for the results, and the real-time feedback signal is generated in response to such requests.

In step 80, the management module determines whether an adjustment to its operation is needed. For example, the management module may compare the generated network traffic results to a set of particular TOS goals to determine whether the management module is achieving these TOS goals. If no adjustment is needed (e.g., if the QoS goals are achieved), step 80 proceeds back to step 74. If an adjustment is needed (e.g., if the QoS goals are not achieved), step 80 proceeds to step 82.

In step 82, the management module adjusts the control parameters (initialized in step 72) according to the one or more algorithms based on the real-time feedback results. Such adjustments typically improve the data communications device's ability to attain the particular TOS goals for the management module. Then, step 82 proceeds back to step 74.

When the data communications device 10 is in normal operation, the management module may perform several iterations of the steps of procedure 70. Through each iteration, the management module ensures that the data communications device 10 operates in such a manner that the TOS goals are likely to be achieved. As the characteristics of the outputted network traffic change (i.e., the packets 14 transmitted from the output scheduler 24), the data communications device 10 dynamically alters its operation to accommodate such changes.

A further explanation will now be provided for each of the different network packet management modules 16, 18, 20 beginning with the input scheduler 16. In particular, separate examples are provided of each management module 16, 18, 20 in the context of a data communications device 10 that supports a variety of QoS classes (e.g., video, audio, general data and best effort).

Input Scheduler Example

In step 72, the input scheduler 16 initializes a set of control parameters controlling the manner in which packets are placed within the queue structure 28. In particular, the set of control parameters assigns a particular packet class to each queue 30 and controls the size of each queue 30. By way of example, packets 14 of the best effort class are assigned to queue 30-A of the queue structure 28. General data packets are assigned to queue 30-B. Audio packets are assigned to queue 30-C. Video packets are assigned to queue 30-D. The queue sizes can be set such that the queue structure 28 can store an equal number of best effort, general data, audio and video packets.

In step 74, the input scheduler 16 performs its function of scheduling packets 14 within the queue structure 28. For example, as network packets 14 arrive at the data communications device 10, the input scheduler 16 stores all packets of the best effort class in queue 30-A, all packets of the general data class in queue 30-B, and so on.

In step 76, the input scheduler 16 determines whether it should continue scheduling network packets 14. For example, a shutdown signal received by the data communications device 10 may cause the input scheduler 16 to terminate its packet scheduling operation.

In step 78, the input scheduler 16 receives customized real-time feedback results that are based on traffic data accumulated by the traffic monitor 26. In particular, the traffic analyzer 32-IS (i.e., the controller 34-IS in conjunction with the memory 36-IS) operates on general traffic data provided in the real-time feedback signal 38 to generate customized results for the input scheduler 16. Alternatively, the input scheduler 16 sends a request signal 40 to the traffic monitor 26 to request traffic data in a customized form, and the traffic monitor 26 responds with the customized results stored within the real-time feedback signal 38.

In step 80, the input scheduler 16 determines whether to continue with the present queue assignments and the present queue sizes depending upon whether particular QoS goals for the input scheduler 16 have been achieved. For example, the input scheduler 16 may have a QoS goal of providing 25% of the output scheduler's bandwidth to general data packets. If the real-time feedback results indicate that the data communications device 10 has achieved the QoS goals, the input scheduler 16 proceeds back to step 74. Otherwise, the input scheduler 16 proceeds to step 82.

In step 82, the input scheduler 16 adjusts the control parameters according to one or more algorithms and real-time feedback results in an attempt to achieve the QoS goals. For example, suppose the input scheduler 16 fails to achieve the goal of providing 25% of the output scheduler's bandwidth to general data packets even though the queue assigned to general data packets is generally full and the other queues are generally empty. In such a situation, the input scheduler 16 runs an algorithm on this traffic data and determines that the failure may be due to the discarding of general data packets due to congestion at the output scheduler 24 (resulting from high network traffic in the network 12). Accordingly, the algorithm of the input scheduler 16 may direct the input scheduler 16 to increase the queue size of the queue responsible for temporarily storing general data packets (e.g., queue 30-B) since buffering the general data packets, in contrast to discarding general data packets, increases the likelihood that the packets will be transmitted successfully.

The input scheduler 16 then returns to step 74, and schedules newly arriving packets 14 in the queue structure 28 based on the adjusted control parameters. Over time, the procedure 70 may loop through steps 74–82 several times such that the input scheduler 16 changes its operation dynamically over time in response to variations in the network traffic passing through the data communications device 10. For example, suppose that the network congestion clears a few minutes later. At that time, the input scheduler 16 may determine that the larger queue size is no longer necessary and reclaim some space in the memory 22. In one embodiment, the input scheduler 16 determines whether a control parameter adjustment should be made (step 80) approximately every minute (60 seconds).

Since such changes occur in an automated manner in response to the real-time feedback signal 38, rather than in response to human intervention (such as by a network administrator) over extended and perhaps protracted periods of time, the input scheduler 16 provides for superior network packet scheduling. In particular, the input scheduler 16 is capable of adapting and adjusting its operation to short and perhaps subtle changes in network traffic in time frames that are orders of magnitude shorter than conventional techniques requiring either human intervention or techniques that focus onlu on traffic arrival patterns from the network. Such changes would go unnoticed by conventional techniques that collect traffic data over extended time periods.

Reorder Manager Example

A further explanation of the operation of the reorder manager 18 in the context of QoS classes will now be provided with reference to FIG. 4. In step 72, the reorder manager 18 initializes a set of control parameters which control the order of the queues 30 within the queue structure 28. As such, the control parameters effectively control the priority of QoS classes handled by the data communications device 10. By way of example, network packets of the best effort class initially are given the lowest priority and assigned to queue 30-A of the queue structure 28. General data packets initially are given the a higher priority and assigned to queue 30-B. Audio packets initially are given a higher priority and assigned to queue 30-C. Video packets initially are given the highest priority and assigned to queue 30-D.

In step 74, the reorder manager 18 orders the queues 30 within the queue structure 28 based on the control parameters initialized in step 72. For example, the reorder manager 18 orders queue 30-D first to give the video QoS class the highest priority, followed by queue 30-C for the audio QoS class, queue 30-B for the general data QoS class, and queue 30-A for the best effort QoS class.

In step 76, the reorder manager 18 determines whether it should continue to order the queues 30. A shutdown signal received by the data communications device 10 would cause the reorder manager 18 to terminate its queue ordering operation. Otherwise, the reorder manager 18 proceeds to step 78.

In step 78, the reorder manager 18 receives customized real-time feedback results that are based on traffic data monitored by the traffic monitor 26. In particular, the traffic analyzer 32-RM (i.e., the controller 34-RM in conjunction with the memory 36-RM) operates on general traffic data provided in the real-time feedback signal 38 to generate customized results for the reorder manager 18. Alternatively, the reorder manager 18 sends a request signal 40 to the traffic monitor 26 to request traffic data in a customized form, and the traffic monitor 26 responds with the customized results stored within the real-time feedback signal 38.

In step 80, the reorder manager 18 determines whether particular QoS goals for the reorder manager 18 have been achieved. For example, the reorder manager 18 may have a QoS goal of providing 25% of the output scheduler's bandwidth to general data packets. If the real-time feedback results indicate that the reorder manager 18 meets this goal, the reorder manager 18 proceeds to step 74. Otherwise, the reorder manager 18 proceeds to step 82.

In step 82, the reorder manager 18 adjusts its control parameters according to one or more algorithms and the real-time feedback results. For example, the reorder manager 18 may use an anti-starvation algorithm to promote any QoS classes that are prevented from transmitting due to other QoS classes overutilizing the output sheduler 24. In this situation, the anti-starvation algorithm may reprioritize the queues 30, at least temporarily, to allow packets of the non-transmitting QoS class (i.e., the starved class) to transmit.

As another example, in step 82, if the real-time feedback results indicate that 20% of the output scheduler's bandwidth is general data packets and a reorder manager algorithm indicates that 25% bandwidth for general data packets can be achieved by re-prioritizing the list of traffic classes such that, at least temporarily, general data is given a higher priority than audio packets, the reorder manager 18 adjusts the control parameters accordingly. That is, the reorder manager 18 swaps the priority of the general data QoS queue (queue 30-B) and the audio QoS queue (queue 30-C) on its prioritization list such that the general data QoS queue is given higher priority. Similarly, if the real-time feedback results indicate that only 5% of the output scheduler's bandwidth is general data packets, the reorder manager algorithm may instruct the reorder manager 18 to take more drastic measures such as giving the audio QoS queue (queue 30-C) a higher priority than the video QoS queue (queue 30-D).

The reorder manager 18 then returns to step 74, and schedules newly arriving packets 14 in the queue structure 28 based on the adjusted control parameters. Over time, the procedure 70 may loop through steps 74–82 several times such that the reorder manager 18 changes its operation dynamically over time in response to variations in the network traffic passing through the data communications device 10. In one embodiment, the reorder manager 18 determines whether a control parameter adjustment should be made (step 80) approximately every 5 to 10 seconds. Since such changes occur in response to a real-time feedback signal rather than in response to human intervention (such as by a network administrator) over extended and perhaps protracted periods of time, the reorder manager 18 provides superior reordering. In particular, the reorder manager 18 is capable of adapting and adjusting its operation to short and perhaps subtle changes in network traffic in time frames that are orders of magnitude shorter than conventional techniques requiring human intervention or rely on traffic arrival patterns into the data communications device from the network.

Discard Manager Example

A further explanation of the operation of the discard manager 20 will now be provided with reference to FIG. 4. In step 72, the discard manager 20 initializes a set of control parameters that control the discarding of network packets 14 from the queue structure 28. By way of example, the control parameters direct the discard manager 20 to discard all best effort packets before discarding all other packets. Additionally, the control parameters direct the discard manager 20 to discard general data packets prior to discarding audio packets, and then to discard audio packets prior to discarding video packets.

In step 74, the discard manager 20 discards packets from one or more of the queues 30 if any of the queues 30 become filled. For example, suppose that the best effort QoS queue (e.g., queue 30-A) becomes filled. In response, the discard manager 20 discards packets from the best effort queue (queue 30-A).

In step 76, the discard manager 20 determines whether it should continue to operate. For example, a shutdown signal received by the data communications device 10 would cause the discard manager 20 to terminate its queue ordering operation. Otherwise, the discard manager 20 proceeds to step 78.

In step 78, the discard manager 20 receives customized real-time feedback results that are based on traffic monitored by the traffic monitor 26. In particular, the traffic analyzer 32-DM (i.e., the controller 34-DM in conjunction with the memory 36-DM) operates on general traffic data provided in the real-time feedback signal 38 to generate customized results for the discard manager 20. Alternatively, the discard manager 20 sends a request signal 40 to the traffic monitor 26 to request traffic data in a customized form, and the traffic monitor 26 responds with the customizes results stored within the real-time feedback signal 38.

In step 80, the discard manager 20 determines whether particular QoS goals for the discard manager 20 have been achieved. For example, the discard manager 20 may have a QoS goal of providing 30% of the output scheduler's bandwidth to video data packets. If the real-time feedback results indicate that the discard manager 20 meets this goal, the discard manager 20 proceeds to step 74. Otherwise, the discard manager 20 proceeds to step 82.

In step 82, the discard manager 18 adjusts its set of control parameters according to a discard algorithm and the real-time feedback results in signal 38 (see FIG. 1). For example, if the real-time feedback results indicate that only 25% of the output scheduler's bandwidth is video data packets, 5% short of the QoS goal of 30% for video packet bandwidth, the discard manager 20 adjusts the control parameters such that some non-video packets are discarded to make more bandwidth available to video packets. By way of example, suppose that the discard algorithm determines that the discard manager 20 should discard packets from the queue assigned to receive best effort packets (queue 30-A) in an attempt to raise the video packet bandwidth above 30%. Accordingly, the discard manager 20 adjusts the control parameters to allow discarding of best effort packets from the queue structure 28. Step 82 then proceeds back to step 74.

In step 74, the discard manager 20 discards best effort packets from the queue structure 28. The effect of such discarding will be sensed by the traffic monitor 26 and cause a change in the traffic data within the real-time feedback signal 38 which is sent to the discard manager 20. Accordingly, a feedback loop is formed that enables the discard manager 20 to dynamically control discarding of packets using the real-time feedback signal 38. In one embodiment, the discard manager 20 determines whether a control parameter adjustment should be made (step 80) approximately every second. No human intervention is required.

Traffic Analyzer

Figure 5:
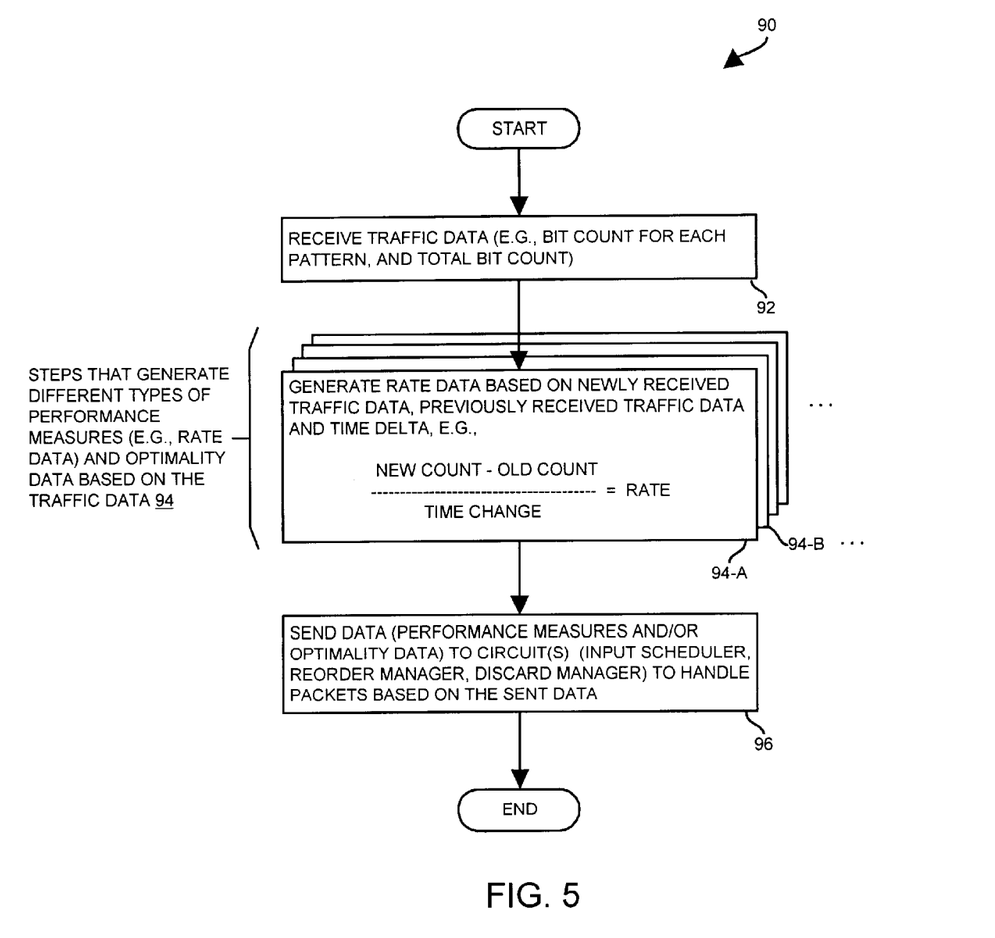
FIG. 5 is a flow diagram illustrating the operation of a traffic analyzer of the data communications device of FIG. 1.

FIG. 5 shows a procedure 90 performed by each of the traffic analyzers 32-IS, 32-RM, and 32-DM demonstrating that traffic analyzer's ability to generate different types of performance measures (e.g., rate data) and optimality data based on the traffic data stored within the real-time feedback signal 38. In step 92, the traffic analyzer 32 receives traffic data within the real-time feedback signal 38. In step 94, the traffic analyzer 32 generates rate data based on the traffic data (e.g., rate data). In step 96, the traffic analyzer 32 provides the rate data to the management module (e.g., the discard manager 20).

Subsequent performance of procedure 90 by the same traffic analyzer 32 may generate a different type of performance measure or optimality data (e.g., step 94-B rather than step 94-A). Accordingly, different types of data can be provided to the management modules 16, 18, 20 for use in managing network packets 14.

Figure 6:
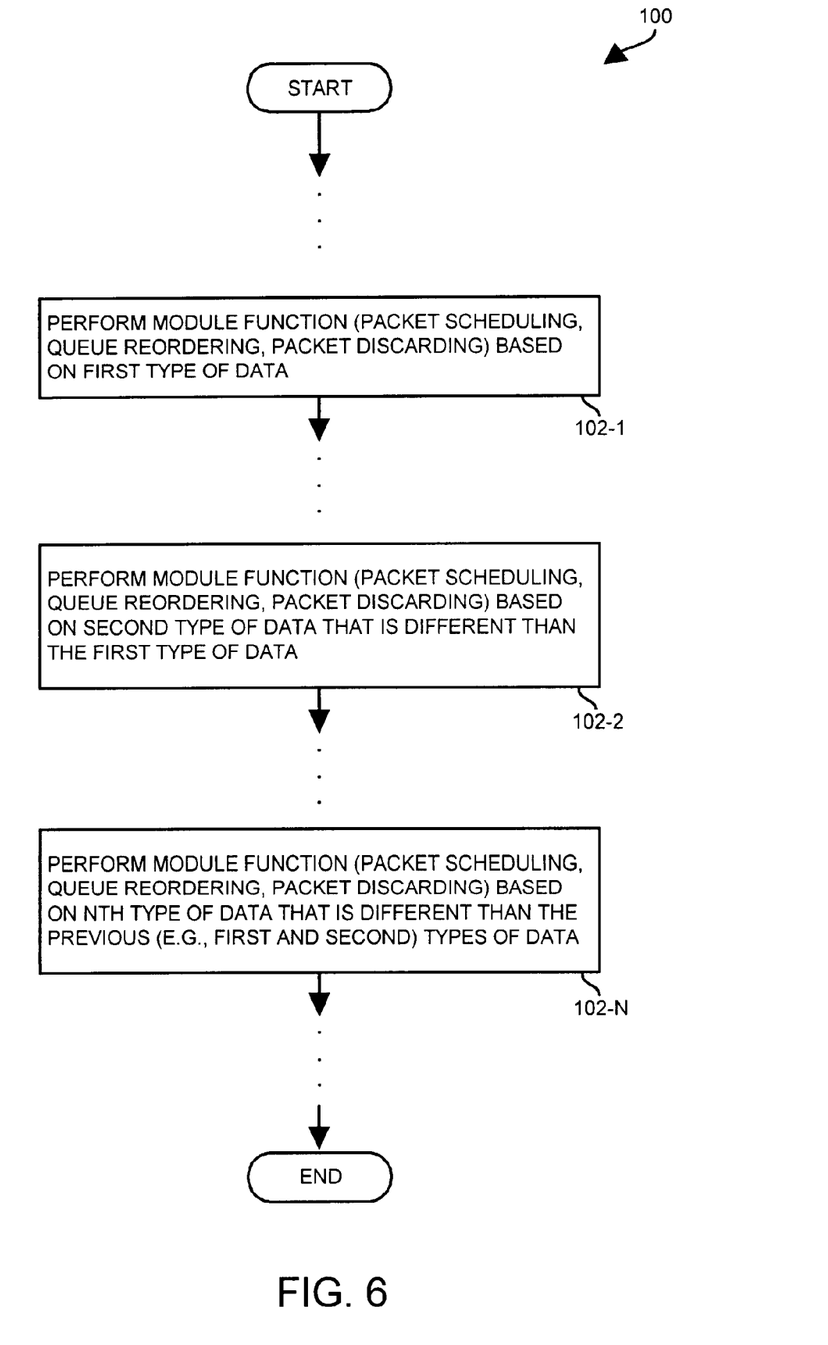
FIG. 6 is a flow diagram illustrating, by way of example, a series of operations of a management module of the data communications device of FIG. 1 in response to different types of traffic information.

As a result, any management module of the data communications device 10 may operate based on a variety of data and algorithms for scheduling, reordering and discarding. FIG. 6 shows a procedure 100 including such operation of the data communications device 10. In step 102-1, a particular management module 16, 18, 20 of the data communications device 10 performs a module function based on a first type of data (e.g., the discard manager 20 discards packets 14 based on rate data). In step 102-2, that management module performs a module function based on a second type of data that is different than the first type of data (e.g., the discard manager 20 discards packets 14 based on overall throughput). In step 102-N, the management module performs a module function based on another type of data (e.g., the discard manager 20 discards packets 14 based on percentage bandwidth or the number of contiguous packets of a particular type seen by the traffic monitor 26). Accordingly, the management modules 16, 18, 20 of the data communications device 10 have the flexibility and dynamic operation to optimally manage packets.

Figure 7:
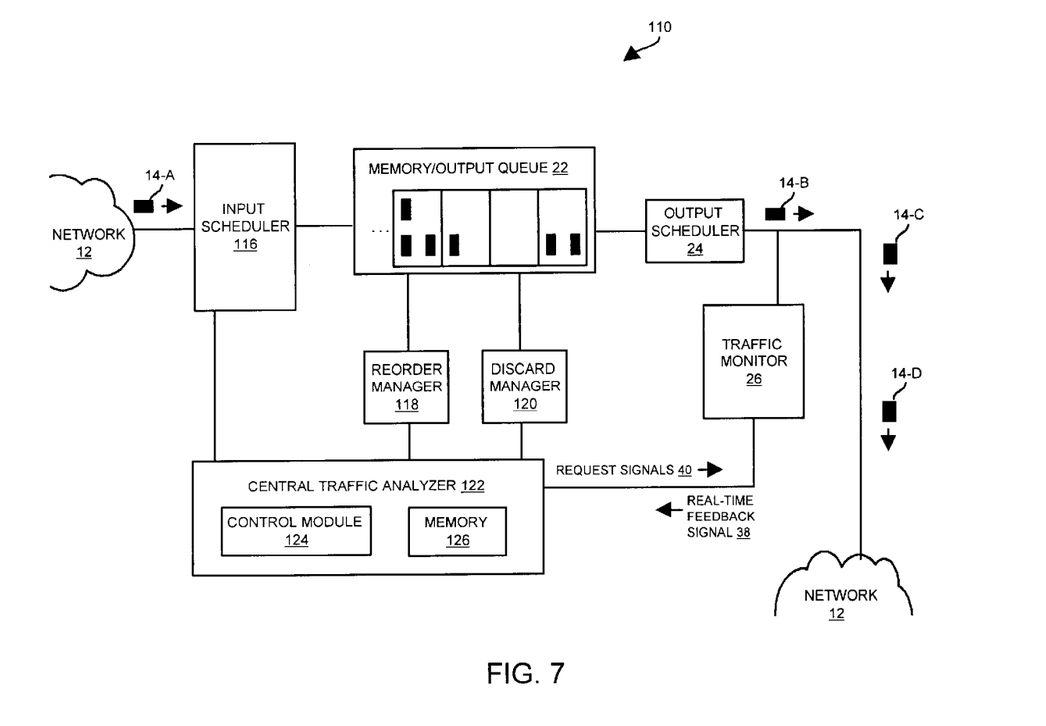
FIG. 7 is a block diagram of a data communications device according to an alternative embodiment of the invention.

FIG. 7 shows a different embodiment of the invention device than that shown in FIG. 1. In particular, FIG. 7 shows a data communications device 110 that includes a central traffic analyzer 122 for analyzing traffic data stored within the real-time feedback signal 38. The central traffic analyzer 122 includes a control module 124 and memory 126. The central traffic analyzer 122 operates to provide traffic data in a manner similar to the traffic analyzers 32 of FIG. 1. However, the centralization of the traffic analyzer 122 provides a benefit of reducing hardware since the centralized circuitry can be shared (e.g., in a multiplexed manner) between the various management modules.

For either the data communications device 10 (see FIG. 1) or the data communications device 110 (FIG. 7), a real-time feedback signal, containing an immediate and up-to-date analysis of network traffic data, is used to enable the device 10, 110 to make dynamic adjustments. Accordingly, such adjustments are based on current traffic conditions rather than out-dated conditions. This allows the invention devices to make adjustments that are superior to conventional adjustment techniques that use traffic data collected over extended periods of time such as hours or even days. Furthermore, no human intervention is required to make the adjustments for the invention devices. That is, such adjustments are made in an automatic and routine manner alleviating the need for human intervention.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the above-discussed invention data communications devices can be any type of network related device that receives and transmits data packets. In particular, the data communications devices 10, 110 can be routers, bridges, switches, access servers, gateways, hubs, proxy servers, repeaters, and so forth which exchange data over an interconnection of data links. The data links may be physical cables (e.g., electrical or fiber optic connections) or wireless communication mechanisms (e.g., cellular telephony equipment). Such data communications devices can be general purpose computers such as personal computers, workstations, minicomputers, mainframes and the like running specialized network software, or specialized hardware such as cellular base stations, web-site kiosks, facsimile or e-mail servers, video servers, and so forth.

In the context of devices with multiple inputs or outputs, it should be understood that the elements shown in FIGS. 1 and 7 apply to individual outputs of such devices. For example, for a router with multiple inputs and outputs, the elements of FIG. 1 illustrate the portions of the router that operate for a particular output of the router. Other outputs of the router would have similar elements or may share a centralized component.

Additionally, the data communications devices of the invention can be used with various network protocols and with various network types. In particular, networks environments having data rates such as fractional T1, T1, E1 or higher or lower, are suitable for the invention.

Furthermore, various media are suitable for carrying the real-time feedback signal 38 (see FIGS. 1 and 7). The signal 38 may be digital, analog, modulated (AM or FM) or spread spectrum wireless (e.g., CDMA). Additionally, the media can be electrical, optical or wireless.

Moreover, the traffic analyzer 32, 122 and/or the traffic monitor 26 may be external to the data communications device 10, 110. That is, a conventional data communications device and a conventional traffic monitor can be adapted such that the traffic monitor provides a real-time feedback signal rather than simple data for storage and post-processing. Similarly, a conventional data communications device can be adapted to receive real-time results as input. The traffic analyzer then analyzes the traffic data contained within the real-time signal and generates real-time results that enable the data communications device to make dynamic adjustments. Accordingly, human intervention is not required to make adjustments, and such adjustments are made automatically in a timelier manner.

Additionally, it should be understood that the data communications device may include other management modules (e.g., other modules in addition to the input scheduler 16, the reorder manager 18 and the discard manager 20), and that such modules may operate according to one or more algorithms using the real-time feedback results derived from the real-time feedback signal as an input. Accordingly, adjustments to the operation of the modules are based, at least partially, on the real-time feedback signal.

It should be understood that it is unnecessary for each management module to operate according to the real-time feedback signal. Rather, at least one management module operates according to the real-time feedback signal. Some or all of the management modules may use conventional algorithms to determine operation. However, at least one of the management modules uses an algorithm that takes the generated real-time feedback data as an input. To reduce the complexity of having to create new algorithms, conventional algorithms can be used where a normally non-real-time input is replaced with the real-time feedback results.

Furthermore, it should be understood that the real-time feedback signal 38 is preferably sent automatically from the traffic monitor 26. In this situation, there is no need for the traffic monitor 26 to receive a request signal 40.

As an alternative, if the traffic monitor 26 is a sophisticated device capable of providing customized results, the traffic monitor 26 waits for the request signal 40 to identify a particular type customized result and then sends the real-time feedback signal 38 in response to the request 40. In this situation, the requests 40 are regular in nature such that the real-time feedback signal 38 is provided routinely enabling the data communications device to maintain packet management under dynamic control.

Furthermore, it should be understood that the procedure 70 (see FIG. 4) can be modified such that the control parameters of the management module are adjusted regardless of whether the data communications device presently achieves its TOS requirements (e.g., QoS goals). Accordingly, performance improvements are attempted continuously.

Additionally, it should be understood that classes other than QoS classes are suitable TOS for the invention. For example, dedicated TOS classes can be established for particular events such as a scheduled point-to-point audio/video conference or a scheduled pay-per-view event. In such situations, data communication devices along a path of the network 12 operate to provide a customized TOS between the source and destination for each event.

Furthermore, it should be understood that the operations of the input scheduler 16, the reorder manager 18, the discard manager 20, and perhaps other modules using the real-time feedback signal 38, can be based on a variety of metrics. In one embodiment, the real-time feedback signal 38 indicates, and these modules use, as metrics, at least one of a maximum packet size for each of the multiple packet classes, a minimum packet size for each of the multiple packet classes, a mean packet size for each of the multiple packet classes, a maximum packet size for all of the multiple packet classes, a minimum packet size for all of the multiple packet classes, a mean packet size for all of the multiple packet classes, a maximum number of contiguous bits for each of the multiple packet classes, a minimum number of contiguous bits for each of the multiple packet classes, a mean number of contiguous bits for each of the multiple packet classes, a maximum number of contiguous bits for all of the multiple packet classes, a minimum number of contiguous bits for all of the multiple packet classes, and a mean number of contiguous bits for all of the multiple packet classes. Other similar traffic-related metrics can be used as well, and are intended to be within the scope of the invention.

What is claimed is:

1. A method for managing packets in a data communications device having a memory, the method comprising the steps of:

transmitting an initial set of packets from the data communications device;

monitoring transmission of the initial set of the packets from the data communications device, and providing a real-time feedback signal indicating transmission information regarding the initial set of packets;

manipulating a new set of packets within the memory of the data communications device based on the real-time feedback signal; and transmitting the new set of packets from the data communications device based on how the new set of packets was manipulated within the memory of the data communications device.

2. The method of claim 1 wherein each packet belongs to one of multiple packet classes, and wherein the step of monitoring and providing includes the step of:

generating the real-time feedback signal to indicate transmission levels of the multiple packet classes for the initial set of packets.

3. The method of claim 2 wherein the memory of the data communications device stores a queue structure, and wherein the step of manipulating includes the step of:

scheduling a packet of the new set of packets in the queue structure based on the transmission levels of the multiple packet classes for the initial set of packets, as indicated by the real-time feedback signal.

4. The method of claim 2 wherein the memory of the data communications device stores a queue structure, and wherein the step of manipulating includes the step of:

reordering queues within the queue structure when the transmission levels of the multiple packet classes for the initial set of packets, as indicated by the real-time feedback signal, cause the data communications device to detect a reorder condition.

5. The method of claim 2 wherein the memory of the data communications device stores a queue structure, and wherein the step of manipulating includes the step of:

discarding a packet of the new set of packets from the queue structure when the transmission levels of the multiple packet classes for the initial set of packets, as indicated by the real-time feedback signal, cause the data communications device to detect a discard condition.

6. The method of claim 2 wherein the memory of the data communications device stores a queue structure, and wherein the step of manipulating includes the steps of:
   scheduling each of the new set of packets in the queue structure based on the transmission levels of the multiple packet classes for the initial set of packets, as indicated by the real-time feedback signal;
   reordering queues of the queue structure when the transmission levels of the multiple packet classes for the initial set of packets, as indicated by the real-time feedback signal, cause the data communications device to detect a reorder condition; and
   discarding a packet of the new set of packets from the queue structure when the transmission levels of the multiple packet classes for the initial set of packets, as indicated by the real-time feedback signal, cause the data communications device to detect a discard condition.

7. The method of claim 2 wherein each packet includes a bit pattern indicative of one of the multiple packet classes, and wherein the step of monitoring and providing includes the step of:
   sampling packets from the initial set of packets;
   recognizing, for each sampled packet, a bit pattern of that packet, and updating a set of data structures based on the recognized bit pattern of that packet, the data structures respectively corresponding to the multiple packet classes; and
   generating the real-time feedback signal based on the updated set of data structures such that the real-time feedback signal is indicative of the transmission levels of the multiple packet classes for the initial set of packets.

8. The method of claim 7 wherein the real-time feedback signal indicates a bit count for each of the multiple packet classes, and a total bit count; and wherein the method further comprises the step of:
   providing a bit rate for each of the multiple packet classes based on the bit count for each of the multiple packet classes and the total bit count such that the new set of packets are manipulated based on the bit rate for each of the multiple packet classes.

9. The method of claim 2, further comprising the step of:
   generating, prior to the step of monitoring and providing, a request signal for information regarding the transmission levels of the multiple packet classes for the initial set of packets.

10. The method of claim 9 wherein the step of monitoring and providing includes the step of:
    generating the real-time feedback signal in response to the request signal.

11. A data communications device, comprising:
    a storage and transmission circuit that stores and transmits packets;
    a traffic monitor, coupled to the storage and transmission circuit, that monitors packet transmissions from the storage and transmission circuit, and generates a real-time feedback signal indicating packet transmission information; and
    a control circuit, coupled to the storage and transmission circuit and the traffic monitor, that manipulates packets within the storage and transmission circuit based on the real-time feedback signal, the storage and transmission circuit transmitting packets based on how the packets are manipulated by the control circuit.

12. The data communications device of claim 11 wherein each packet belongs to one of multiple packet classes, and wherein the traffic monitor includes:
    a controller that generates the real-time feedback signal to indicate transmission levels of the multiple packet classes for packets transmitted from the storage and transmission circuit.

13. The data communications device of claim 12 wherein the storage and transmission circuit includes a memory that stores a queue structure, and wherein the control circuit includes:
    an input scheduler having a first input that receives packets, a second input that receives the real-time feedback signal, and an output that schedules the received packets in the queue structure based on the transmission levels of the multiple packet classes, as indicated by the real-time feedback signal.

14. The data communications device of claim 12 wherein the storage and transmission circuit includes a memory that stores a queue structure, and wherein the control circuit includes:
    a reorder manager having an input that receives the real-time feedback signal, and an output that reorders queues within the queue structure when the transmission levels of the multiple packet classes, as indicated by the real-time feedback signal, cause the reorder manager to detect a reorder condition.

15. The data communications device of claim 12 wherein the storage and transmission circuit includes a memory that stores a queue structure, and wherein the control circuit includes:
    a discard manager having an input that receives the real-time feedback signal, and an output that discards a packet from the queue structure when the transmission levels of the multiple packet classes, as indicated by the real-time feedback signal, cause the discard manager to detect a discard condition.

16. The data communications device of claim 12 wherein the storage and transmission circuit includes a memory that stores a queue structure, and wherein the control circuit includes:
    an input scheduler having a first input that receives packets, a second input that receives the real-time feedback signal, and an output that schedules the received packets in the queue structure based on the transmission levels of the multiple packet classes, as indicated by the real-time feedback signal;
    a reorder manager having an input that receives the real-time feedback signal, and an output that reorders queues of the queue structure when the transmission levels of the multiple packet classes, as indicated by the real-time feedback signal, cause the reorder manager to detect a reorder condition; and
    a discard manager having an input that receives the real-time feedback signal, and an output that discards a packet from the queue structure when the transmission levels of the multiple packet classes, as indicated by the real-time feedback signal, cause the discard manager to detect a discard condition.

17. The data communications device of claim 16 wherein the input scheduler, the reorder manager and the discard manager use respective instances of the real-time feedback signal to operate asynchronously relative to each other.

18. The data communications device of claim 16 wherein the input scheduler, the reorder manager and the discard manager use a same instance of the real-time feedback signal when in operation.

19. The data communications device of claim 12 wherein each packet includes a bit pattern indicative of one of the multiple packet classes, and wherein the traffic monitor includes:
   a pattern recognizer that (i) samples packets transmitted from the storage and transmission circuit, and (ii) recognizes, for each sampled packet, a bit pattern of that packet; and
   a controller, coupled to the pattern recognizer, that (i) updates, for each sampled packet, a set of data structures based on the recognized bit pattern of that packet, the data structures respectively corresponding to the multiple packet classes, and (ii) generates the real-time feedback signal based on the updated set of data structures such that the real-time feedback signal is indicative of the transmission levels of the multiple packet classes.

20. The data communications device of claim 19 wherein the real-time feedback signal indicates a bit count for each of the multiple packet classes, and a total bit count; and wherein the control circuit includes:
   a traffic analyzer that receives the real-time feedback signal and provides a bit rate for each of the multiple packet classes based on the bit count for each of the multiple packet classes and the total bit count such that packets are manipulated within the storage and transmission circuit based on the bit rate for each of the multiple packet classes.

21. The data communications device of claim 12 wherein the real-time feedback signal indicates, as metrics, at least one of a maximum packet size for each of the multiple packet classes, a minimum packet size for each of the multiple packet classes, a mean packet size for each of the multiple packet classes, a maximum packet size for all of the multiple packet classes, a minimum packet size for all of the multiple packet classes, a mean packet size for all of the multiple packet classes, a maximum number of contiguous bits for each of the multiple packet classes, a minimum number of contiguous bits for each of the multiple packet classes, a mean number of contiguous bits for each of the multiple packet classes, a maximum number of contiguous bits for all of the multiple packet classes, a minimum number of contiguous bits for all of the multiple packet classes, and a mean number of contiguous bits for all of the multiple packet classes.

22. The data communications device of claim 12 wherein the control circuit includes:
   a control module that generates a request signal for information regarding the transmission levels of the multiple packet classes.

23. The data communications device of claim 22 wherein the traffic monitor includes:
   a controller having an input that receives the request signal, and an output that provides the real-time feedback signal in response to the request signal.

24. The method of claim 1 wherein the step of providing a real-time feedback signal further includes the step of generating customized data to send as said feedback signal.

25. The method of claim 24 wherein said data communications device has a plurality of management functions and said step of generating customized data includes the step of generating data customized to a particular management function.

26. The method of claim 24 wherein said step of generating customized data further includes generating data customized to achieve a type of service goal.

27. The data communications device of claim 11 further comprising a plurality of management modules, each said management module having a particular data management function, and wherein the traffic monitor further includes a controller that generates a real-time feedback signal of customized data, said data customized to the particular function of one of said management modules.

* * * * *